United States Patent
Bracey et al.

(10) Patent No.: US 7,225,209 B2
(45) Date of Patent: May 29, 2007

(54) COMPUTER-IMPLEMENTED METHOD FOR ALLOCATING NEW ADDITIONAL AREA FOR THE DATASET IN STORAGE BASED ON THE SIZE OF THE NEW ADDITIONAL AREA WHEREIN IF THE NEW AREA NUMBER DOES NOT EXCEED CLIPPING THRESHOLD, THE SIZE OF A NEW ADDITIONAL AREA BEING GREATER THAN THE SIZE OF EACH PREVIOUSLY ALLOCATED ADDITIONAL AREA OF THE DATASET

(75) Inventors: Michael John Bracey, Petersfield (GB); John Joseph Campbell, Alton (GB); Julie Chen, San Jose, CA (US); Akira Shibamiya, Los Altos, CA (US); Bryan Frederick Smith, Morgan Hill, CA (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 10/703,998

(22) Filed: Nov. 6, 2003

(65) Prior Publication Data

US 2005/0102331 A1    May 12, 2005

(51) Int. Cl.
  *G06F 17/30* (2006.01)
  *G06F 17/00* (2006.01)
  *G06F 12/00* (2006.01)
(52) U.S. Cl. .......................... 707/205; 707/1; 707/100; 711/171

(58) Field of Classification Search ................ 707/1–5, 707/100–102, 104.1, 200, 205–206; 711/112–113, 711/152, 147, 205–208, 221, 216
See application file for complete search history.

(56) References Cited

U.S. PATENT DOCUMENTS 4,310,883 A * 1/1982 Clifton et al. .............. 707/205

(Continued)

FOREIGN PATENT DOCUMENTS

EP    0703526    *    3/1996    ..................... 3/6

(Continued)

OTHER PUBLICATIONS

Lionel Dyck, "reading and writing data using REXX EXECIO on OS/390 and z/OS", Technical support, Apr. 2003, 3 pages.*

(Continued)

*Primary Examiner*—Srirama Channavajjala
(74) *Attorney, Agent, or Firm*—Janet M. Skafar; Ingrid M. Foerster; Gregory M. Plow

(57) ABSTRACT

A method and article of manufacture, implementing the method, allocates space for a dataset. The dataset has an initial area and zero or more additional allocated areas to provide space for storing the dataset. The size of a new additional area is determined. The new additional area is associated with a new area number, and the size of the new additional area is based on the new area number. Additional space for the dataset is allocated based on the size of the new additional area.

26 Claims, 9 Drawing Sheets

U.S. PATENT DOCUMENTS

| | | | | |
|---|---|---|---|---|
| 5,247,660 | A | | 9/1993 | Ashcraft et al. ............ 395/600 |
| 5,414,826 | A | | 5/1995 | Garcia ......................... 395/425 |
| 5,732,402 | A | * | 3/1998 | Lehman ....................... 707/205 |
| 5,778,393 | A | * | 7/1998 | Blea et al. .................. 707/205 |
| 6,032,160 | A | * | 2/2000 | Lehman ....................... 707/205 |
| 6,085,254 | A | | 7/2000 | Kotsinas et al. ............ 709/235 |
| 6,173,291 | B1 | | 1/2001 | Jenevein ...................... 707/200 |
| 6,295,539 | B1 | * | 9/2001 | Isip, Jr. ...................... 707/201 |
| 6,401,089 | B2 | * | 6/2002 | Isip, Jr. .......................... 707/7 |
| 6,412,053 | B2 | | 6/2002 | Bonola ........................ 711/170 |
| 6,453,383 | B1 | | 9/2002 | Stoddard et al. ............ 711/112 |
| 6,453,404 | B1 | * | 9/2002 | Bereznyi et al. ............ 711/171 |
| 6,470,360 | B1 | | 10/2002 | Vaitheeswaran ............ 707/205 |
| 6,598,224 | B1 | * | 7/2003 | Maeda et al. ................ 717/174 |
| 6,834,290 | B1 | * | 12/2004 | Pugh et al. ................. 707/205 |
| 6,965,899 | B1 | * | 11/2005 | Subramaniam et al. ..... 707/102 |
| 7,028,041 | B2 | * | 4/2006 | L'Heureux .................. 707/101 |
| 7,031,987 | B2 | * | 4/2006 | Mukkamalla et al. ....... 707/204 |
| 2003/0046294 | A1 | * | 3/2003 | Heronimus ................. 707/100 |
| 2003/0120644 | A1 | * | 6/2003 | Shirota ........................... 707/3 |

FOREIGN PATENT DOCUMENTS

| | | | | |
|---|---|---|---|---|
| EP | 0814405 | * | 6/1997 | |
| WO | WO 2005/050492 | * | 2/2005 | ............... 17/30 |
| WO | WO 2005/043414 | * | 5/2005 | ............... 17/30 |

OTHER PUBLICATIONS

Douglas Thain, "Operating system support for space allocation in grid storage systems", no date.*

"Oracle 8i and Oracle 9i Data reorganization and Feature comparisons", Oracle white paper, Mar. 2002, 12 pages.*

Dong Xie, "Fuzzy association rules discovered on effective reduced database algorithm", IEEE international conference on Fuzzy systems, 2005pp. 779-784.*

Tevfik Kosar et al. "data pipelines: enabling large scale mutli-protocol data transfers", MGC '04, ACM, 2004.*

George Baklarz and Bill Wong, "DB2 Universal Database v7.1 for UNIX, Linux, Windows, and OS/2 Database Administration Certification Guide," Fourth Edition, 2001, pp. 419-420, Prentice Hall, Upper Saddle River, NJ, USA.

Eric W. Weisstein, "Inverse Tangent —from MathWorld", Eric Weisstein's world of Mathematics, copyright 1999 CRC Press LLC, copyright 1999-2003, Wolfran Research, Inc., http://mathworld.wolfram.com/InverseTangent.html.

IBM, "DFSMS Version 1 Release 5, DFSMS/MVS VIRS DFSMSdfp Storage Administration Reference," SC26-4920-05, Sixth Edition, Mar. 1999, p. 96, International Business Machines Corporation, http://publibz.boulder.ibm.com/epubs/pdf/dgtls205.pdf.

* cited by examiner

| 1 | 1 | 1 |
|---|---|---|
| 2 | 1 | 2 |
| ⋮ | ⋮ | ⋮ |
| 54 | 1 | 54 |
| ⋮ | ⋮ | ⋮ |
| 1 | 64 | 1 |
| ⋮ | ⋮ | ⋮ |
| 126 | 64 | 549 |
| 127 | 64 | 559 |
| 128 | 64 | 559 |
| ⋮ | ⋮ | ⋮ |
| 255 | 64 | 559 |

Look up a size of secondary extent, ss_extent, to allocate from a secondary extent allocation look-up table based on the extent number and the maximum dataset size. — 290

COMPUTER-IMPLEMENTED METHOD FOR ALLOCATING NEW ADDITIONAL AREA FOR THE DATASET IN STORAGE BASED ON THE SIZE OF THE NEW ADDITIONAL AREA WHEREIN IF THE NEW AREA NUMBER DOES NOT EXCEED CLIPPING THRESHOLD, THE SIZE OF A NEW ADDITIONAL AREA BEING GREATER THAN THE SIZE OF EACH PREVIOUSLY ALLOCATED ADDITIONAL AREA OF THE DATASET

BACKGROUND OF THE INVENTION

1. Field of the Invention

The invention relates to a technique, specifically a method, apparatus, and article of manufacture that implements the method, to determine an amount of space to allocate for a dataset as the dataset grows. This technique is particularly, though not exclusively, suited for use within a database management system.

2. Description of the Related Art

Database management systems allow large volumes of data to be stored and accessed efficiently and conveniently in a computer system. In a relational database management system, data is stored in database tables which effectively organize the data into rows and columns. In the database management system, a database engine responds to user commands to store and access the data. In the computer system, database objects, like tables and indexes, are contained in datasets. A dataset is also referred to as a file. When records are added to the database table, the database management system writes those records to the dataset associated with the specified table.

The dataset is typically stored on one or more hard disk drives. The amount of space available on the disk drives is limited and is managed by an operating system. An extent is an amount of space allocated on a logical volume for storing part of a dataset. A logical volume can be a single disk drive, a portion of a single disk drive, or a portion of multiple disk drives.

A dataset may have one or more extents. In some operating systems, each dataset is associated with a primary extent. As the size of a dataset grows, additional, or secondary extents may be allocated to provide additional space for the dataset. The operating system has a limit as to the total number of secondary extents that may be allocated to a dataset. In a conventional operating system, the size of each secondary extent is the same.

An extent comprises pages for storing the dataset. The page size can be equal to four kilobytes, eight kilobytes, sixteen kilobytes, or thirty-two kilobytes. Logical volumes are mapped to physical disk drives and store data in units such as cylinders, for example. A cylinder has a predefined amount of storage space. The amount of storage space provided in a cylinder is specific to the disk drive model. The extent size may be specified in bytes, kilobytes, megabytes, pages, or cylinders.

In FIG. 1, an exemplary dataset 20 has multiple extents in accordance with the prior art. The dataset 20 is stored in a primary extent 22 of size p and n secondary extents of size s, $S_1$ to $S_n$, 24 to 26, respectively. The database has parameters that allow a user to specify the size p of the primary extent and the size s of the secondary extents.

When a dataset is created, the maximum size of that dataset is implicitly determined, and a primary extent is allocated initially to store that dataset. However, the size of the primary extent is typically smaller than the maximum size of the dataset. Secondary extents are allocated on demand to store the dataset as the dataset grows. The number of secondary extents that can be allocated for a dataset, also referred to as a maximum number of secondary extents, is limited.

In one database management system, a system administrator may specify a primary and secondary extent size when creating tablespaces or indexes, or accept default sizes. When the size of the secondary extent is small, typically the maximum number of extents is reached before the dataset can reach the maximum possible size. Therefore, the dataset is prevented from growing, and no additional data or records may be added to that dataset. Hence, an operation to add data cannot be completed and an application failure occurs, which may result in an application outage. To increase the maximum amount of space that can be used for the dataset, the system administrator, through the facilities of the database management system, defines a new dataset with a new larger primary extent size and/or secondary extent sizes that are sufficiently large to store the maximum size of the dataset, copies the data from the old dataset to the new dataset, and renames the new dataset with the name of the old dataset. Creating the new dataset and copying the data takes time and increases the length of the application outage.

Since the system defined default size for the secondary extents is typically very small, the system administrator usually provides an explicit secondary extent size that is larger than the default secondary extent size to help prevent using up available extents. However, increasing the size of secondary extents may result in wasted space—especially for small datasets. Furthermore, it is not known whether a dataset will reach its ultimate size, therefore much of the allocated space may not be used.

Therefore, there is a need for a technique to improve the allocation of secondary extents. This technique should efficiently allocate space for small datasets. This technique should also reduce the likelihood of using the maximum number of extents prior to reaching the maximum size of the dataset.

SUMMARY OF THE INVENTION

To overcome the limitations in the prior art described above, and to overcome other limitations that will become apparent upon reading and understanding the present specification, the present invention discloses a method, apparatus, and article of manufacture for allocating space for a dataset.

In accordance with the present invention, a method and article of manufacture, implementing the method, allocates space for a dataset. The dataset is associated with an initial area and zero or more additional allocated areas to provide space for storing the dataset. The size of a new additional area is determined. The new additional area is associated with a new area number, and the size of the new additional area is based on the new area number. Additional space for the dataset is allocated based on the size of the new additional area.

In another aspect of the invention, an apparatus stores a dataset. A computer has a data storage device connected thereto. The data storage device has a plurality of areas for storing a dataset. The plurality of areas comprises an initial area having an initial area size and a plurality of additional areas having an additional-area size, wherein the additional-area size varies. In one embodiment, the additional-area size monotonically increases.

In this way, space is allocated efficiently for small datasets, and the likelihood of using a maximum number of areas prior to reaching the maximum size of the dataset is reduced.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to improve performance and availability in substantially any system that allocates space for datasets. The invention is integrated as a component in a database management system. Alternately, the invention may be integrated in an operating system. To simplify the following discussion and facilitate reader understanding, the present invention will be described in the context of use in a database management system.

A technique allocates space for a dataset. In one embodiment, when the size of a dataset is small, the size of a new additional area for that dataset is also small so that space is not wasted. As the size of the dataset increases, the size of the additional areas also increases until, for large datasets, an additional-area clipping threshold is reached at which the size of the additional areas remains constant. In this way, a maximum number of additional areas is not likely to be used prior to reaching the maximum size of the dataset and allocating very large area sizes is avoided.

In another embodiment, a dataset is associated with an initial or primary area to provide space for initially storing the dataset. Each additional area is associated with an area number, and the size of the additional areas is based on the area number.

The term "area" refers to a unit of space for storing, at least in part, a dataset or file. In one embodiment, the term "area" refers to an extent. However, the term "area" is not limited to extents and may refer to other allocation units for storing datasets or files. Although the invention will be described with respect to extents, those of ordinary skill in the art will recognize that the invention may be used with areas other than extents.

Figure 2:
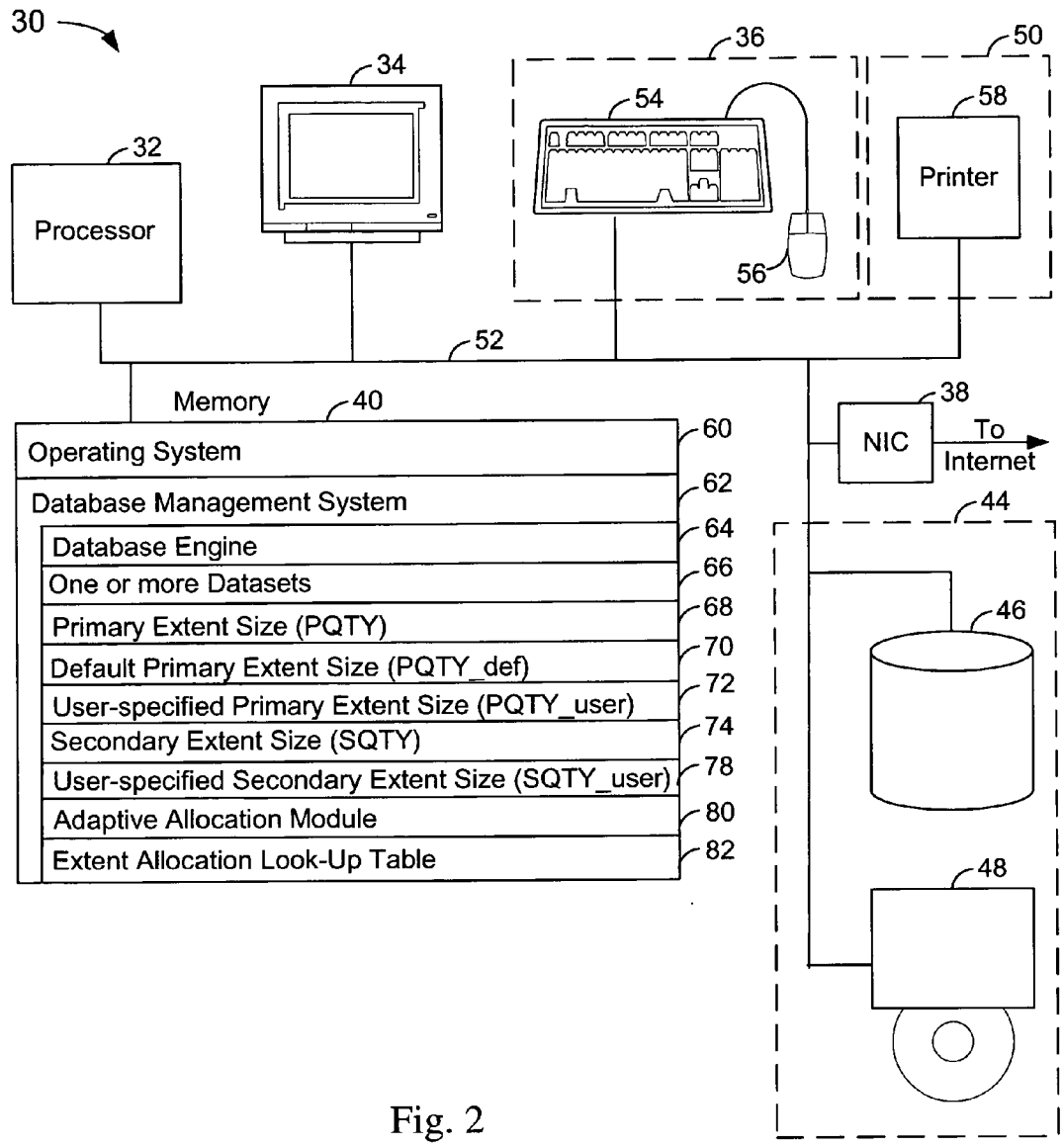
FIG. 2 depicts an illustrative computer system having an adaptive allocation module in accordance with an embodiment of the present invention.

FIG. 2 depicts an illustrative computer system 30 that utilizes the teachings of the present invention. The computer system 30 comprises a processor 32, display 34, input interfaces (I/F) 36, communications interface 38, memory 40, disk memories 44 such as hard disk drive 46 and optical disk drive 48, and output interface(s) 50, all conventionally coupled by one or more busses 52. The input interfaces 36 comprise a keyboard 54 and mouse 56. The output interface is a printer 58. The communications interface 38 is a network interface card (NIC) that allows the computer system 30 to communicate via a network, such as the Internet.

The memory 40 generally comprises different modalities, illustratively semiconductor memory, such as random access memory (RAM), and disk drives. The memory 40 stores operating system 60 and application programs such as the database management system 62. The operating system 60 may be implemented by any conventional operating system, such as z/OS® (Registered Trademark of International Business Machines Corporation), AIX® (Registered Trademark of International Business Machines Corporation), UNIX® (Unix is a registered trademark in the United States and other countries licensed through X/Open Company Limited), and WINDOWS® (Registered Trademark of Microsoft Corporation), and LINUX® (Registered Trademark of Linus Torvalds).

The database management system 62 is a DB2® system (DB2® is a registered trademark of International Business Machines Corporation). However, the inventive technique is not meant to be limited to a DB2® database management system, and may be used with other database management systems.

A database engine 64 allows a user to execute commands to add data to, delete data from, update data within or search the database tables. In one embodiment, the commands are Structured Query Language (SQL) statements that conform to a Structured Query Language standard as published by the American National Standards Institute (ANSI) or the International Standards Organization (ISO). In alternate embodiments, languages other than SQL may be used.

In one embodiment, the specific software modules that implement the present invention are incorporated in the database management system 62. Alternately, the software modules that implement the present invention are incorporated in the operating system 60. Generally, the software modules are tangibly embodied in a computer-readable medium, for example, memory 40 or, more specifically, one of the disk drives 44, and are comprised of instructions which, when executed, by the computer system 40, cause the computer system 40 to utilize the present invention.

In the memory 40, the database management system 62 is comprised of the software modules and data. In one embodiment, the memory 40 may store a portion of the software modules and data making up the database management system 62 in semiconductor memory, while other software modules and data are stored in disk memory. In some embodiments, the memory 40 is comprised of the following:
the operating system 60;
the database management system 62;
a database engine 64 to read data from, add data to, update data within, and delete data from a database table that is stored in a dataset;
one or more datasets 66 to store respective database information;
a primary extent size (PQTY) 68 that may contain a value equal to the value of a system default size (PQTY_def) 70 or a user-specified size (PQTY_user) 72 to define the size of the primary extent for a dataset;
a secondary extent size (SQTY) 74 that contains a value representing the size of a new secondary extent;
a user-specified secondary extent size (SQTY_user) 78;
an adaptive allocation module 80 that determines the size of a new additional area, for example, a secondary extent, and allocates space for a dataset using a determined additional area size, for example, a secondary extent size, in accordance with an embodiment of the present inventive technique; and
an extent allocation look-up table 82 that stores a set of predefined secondary extent sizes based on the maximum size of a dataset and the secondary extent number and, in one embodiment, is used by the adaptive allocation module to determine the size of a new secondary extent.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device. Those skilled in the art will recognize that many modifications may be made to this configuration without departing from the scope of the present invention.

Figure 1:
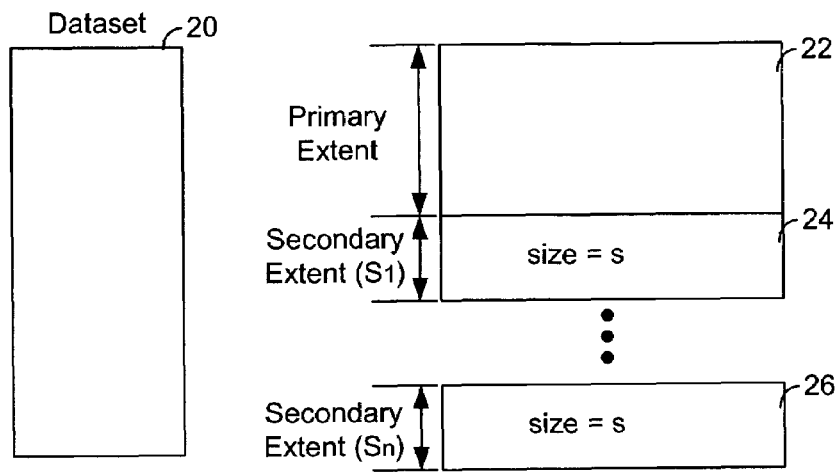
FIG. 1 depicts a dataset and the extents associated with the dataset in accordance with the prior art.
Figure 3:
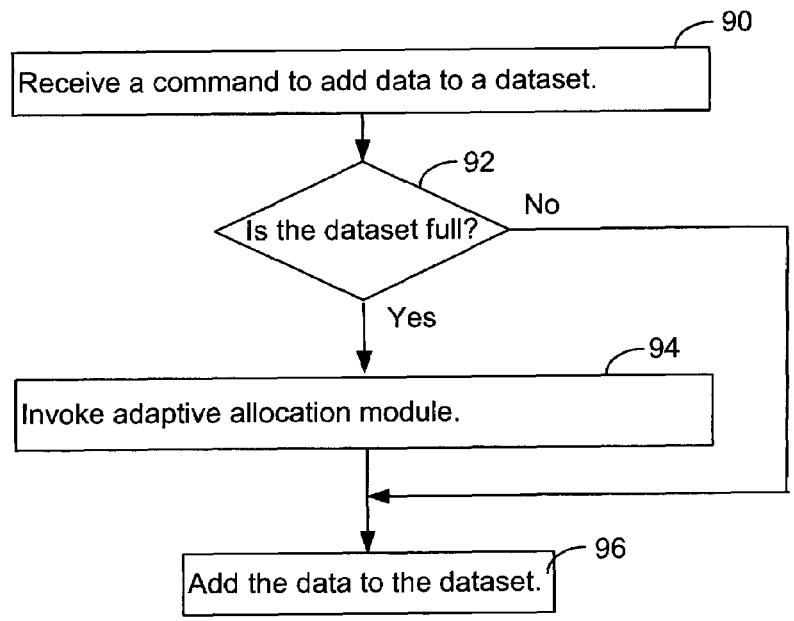
FIG. 3 depicts a high-level flowchart of a portion of the database engine, or alternately the operating system, that invokes the adaptive allocation module of FIG. 2.

FIG. 3 depicts a high-level flowchart of an embodiment of a portion of the database engine which invokes the adaptive allocation module of FIG. 2. In step 90, a command is received to add data to a dataset. For example, a SQL INSERT command may be received to add new data to a table associated with the dataset. Step 92 determines whether the dataset is full, in other words, whether the dataset has sufficient allocated space to store the new data. If not, in step 94, the database engine invokes the adaptive allocation module to determine the size of a new additional area to be added, and allocates space for the new additional area based on the determined size. In step 96, the database engine adds the data to the dataset. If step 92 determines that an additional area does not need to be allocated, step 92 proceeds to step 96.

Figure 4:
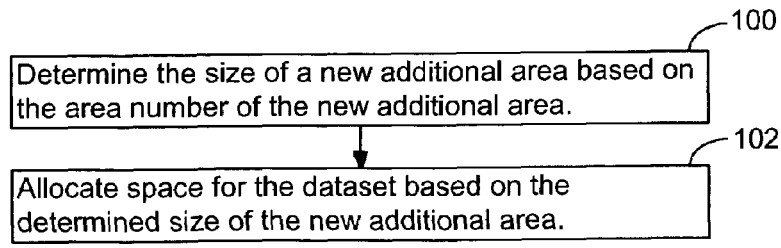
FIG. 4 depicts a high-level block diagram of an embodiment of the adaptive allocation module of FIG. 2.

FIG. 4 depicts a high-level flowchart of an embodiment of a technique of the adaptive allocation module of FIG. 2. The dataset has an initial area and may have zero or more additional areas. The additional areas are associated with area numbers. In step 100, the size of a new additional area is determined to provide additional space for the dataset. The new additional area is associated with a new additional area number. The size of the new additional area is based on the new additional area number. In a more particular embodiment, when the additional area number is low for a small dataset, the size of the new additional area is small. As the number of additional areas increases, the size of the new additional area increases until, for large datasets, an additional area clipping threshold is reached at which the size of the additional areas remains constant. In step 102, additional space for the dataset is allocated based on the determined size of the new additional area. In another exemplary embodiment, the initial area is a primary extent, the additional areas are secondary extents, and the additional area numbers are secondary extent numbers.

Some rules for determining the size of a new additional area are shown below. By way of example, the rules will be described with respect to extents. The term "primary quantity" refers to the variable called "PQTY" that contains the size of the primary extent. The system contains a default value for the size of the primary extent (PQTY_def). A user, for example, the system administrator, may override the system default value by specifying a primary extent size which is stored in a variable called "PQTY_user." The term "SQTY_user" refers to a variable that contains a user-specified value for the size of a secondary extent. The term "SQTY" refers to a size of the new secondary extent. The variable "ss_extent" refers to a sliding scale extent value which is an intermediate value of the size of the new secondary extent that is determined based on the new secondary extent number and the maximum size of the dataset prior to applying at least a subset of the rules described below. The term "MaxAlloc" refers to a variable that contains the maximum size of a secondary extent for a dataset.

In one embodiment, the values of PQTY, PQTY_user, PQTY_def, SQTY, SQTY_user, ss_extent and MaxAlloc are specified in cylinders. Alternately, PQTY, PQTY_user, PQTY_def, SQTY, SQTY_user, ss_extent and MaxAlloc are specified using any one of the following: bytes, kilobytes, gigabytes, and pages. For simplicity, this specification will describe the invention in terms of specifying PQTY, PQTY_user, PQTY_def, SQTY, SQTY_user, ss_extent and MaxAlloc in cylinders; however, in alternate embodiments, units other than cylinders may be used.

The following are rules used by the adaptive allocation module to determine the size of the new secondary extent in one embodiment of the present inventive technique.

(1) To determine the size of the primary extent, if a user specifies a primary extent size (PQTY_user), the adaptive allocation module uses the user-specified primary extent size, that is, PQTY=PQTY_user; otherwise, the adaptive allocation module uses the default primary extent size, that is, PQTY=PQTY_def.

(2) If the user does not specify a value for the secondary extent size, then the size of the new secondary extent can be no smaller than ten percent of the size of the primary extent for that dataset. In other words,
SQTY=max(0.1*PQTY, min(ss_extent, MaxAlloc))

For example, in one embodiment, the value of MaxAlloc is equal to 127 cylinders for a dataset having a maximum dataset size less than thirty-two Gigabytes, and the value of MaxAlloc is equal to 559 cylinders for a dataset having a maximum dataset size greater than or equal to thirty-two Gigabytes.

Alternately, the size of the new secondary extent, SQTY, is determined as follows:

SQTY=max(0.1*PQTY, min(ss_extent, 559 or 127 cylinders if the maximum dataset is size is greater than or equal to thirty-two Gigabytes, or less than thirty-two Gigabytes, respectively)).

(3) If a user specified that no secondary extents are to be allocated, that is, the specified value of SQTY_user is equal to zero, then SQTY is also equal to zero, and no secondary extents are allocated.

(4) If the user specified a value for the size of a secondary extent (SQTY_user) and if the specified value of SQTY_user>0, then the size of the new secondary extent is no smaller than that specified size in SQTY_user. In other words, SQTY=max(min(ss_extent, MaxAlloc), SQTY_user).

For example, in one embodiment, described above, the value of MaxAlloc is equal to 127 cylinders for a dataset having a maximum dataset size less than thirty-two Gigabytes, and the value of MaxAlloc is equal to 559 cylinders for a dataset having a maximum dataset size greater than or equal to thirty-two Gigabytes.

Alternately, the size of the new secondary extent, SQTY, is determined as follows:

SQTY=max(min(ss_extent, 559 or 127 cylinders if the maximum dataset is size is greater than or equal to thirty-two Gigabytes, or less than thirty-two Gigabytes, respectively), SQTY_user).

In an alternate embodiment, one or any combination of the rules may be applied in the adaptive allocation module.

Table 1, below, depicts, for various maximum dataset sizes, the maximum number of secondary extents to store the dataset at the maximum dataset size, and the maximum secondary extent size. For example, for a dataset that can store up to eight gigabytes, the maximum number of secondary extents to store that dataset is equal to 154, and the maximum secondary extent size is equal to 127 cylinders.

TABLE 1

| Maximum Dataset Size (Gigabytes) | Maximum number of secondary extents to store a dataset at the maximum dataset size (assumes 1 cylinder to start) | Maximum Secondary Extent Size (Cylinders) |
|---|---|---|
| 1 | 54 | 127 |
| 2 | 75 | 127 |
| 4 | 107 | 127 |
| 8 | 154 | 127 |
| 16 | 246 | 127 |
| 32 | 172 | 559 |
| 64 | 255 | 559 |

In one embodiment of the present inventive technique, for at least a subset of secondary extents for a dataset, the size of the secondary extents of the subset increases according to a sliding scale so that the maximum dataset size can be reached within the maximum number of secondary extents allowed for that dataset size.

The maximum secondary extent size is equal to a first predetermined maximum size for datasets having a maximum dataset size that is less than a predetermined dataset size threshold. In one embodiment, the predetermined dataset size threshold is equal to thirty-two gigabytes and the predetermined maximum size is equal to a first predetermined size limit. In one embodiment, the first predetermined size limit is equal to 127 cylinders.

For datasets having a maximum dataset size that is greater than or equal to the predetermined dataset size threshold, the maximum secondary extent size is equal to a second predetermined size limit. In one embodiment, the second predetermined size limit is equal to 559 cylinders. When the size of the secondary extents reaches the maximum secondary extent size at a secondary extent clipping threshold, all subsequently allocated secondary extents have a size equal to the maximum secondary extent size.

In general, this technique improves disk space utilization, reduces the likelihood that the maximum number of extents is reached prior to the maximum dataset size, and can improve performance when adding data. Using the present inventive technique, space for small datasets is allocated efficiently because the size of the secondary extents is small when the number of secondary extents is low. For large datasets, the secondary extent size does not continue to increase beyond the maximum secondary extent size. Therefore the technique avoids very large secondary extent sizes. Contiguous space to allocate a very large extent may be difficult to find on a logical volume. Using a maximum secondary extent size increases the likelihood that sufficient space will be found on a logical volume to allocate to the new secondary extent.

In one embodiment, the predetermined secondary extent clipping threshold is the midpoint of the maximum number of secondary extents. Choosing the midpoint as the predetermined secondary extent clipping threshold helps to reduce the maximum secondary extent size and reduces the potential for wasting disk space. The midpoint is determined by dividing the maximum number of secondary extents for a full-size dataset by two. For example, if 255 secondary extents are used to reach the full size for a dataset, the midpoint is equal to 127 or 128, depending on the embodiment. Alternately, the midpoint is not used. For example, for small datasets having a maximum number of fifty-four secondary extents, the maximum size allowed for a secondary extent may not be reached. In yet another alternate embodiment, the predetermined secondary extent clipping threshold is not at the midpoint but is at a different point.

Figure 5:
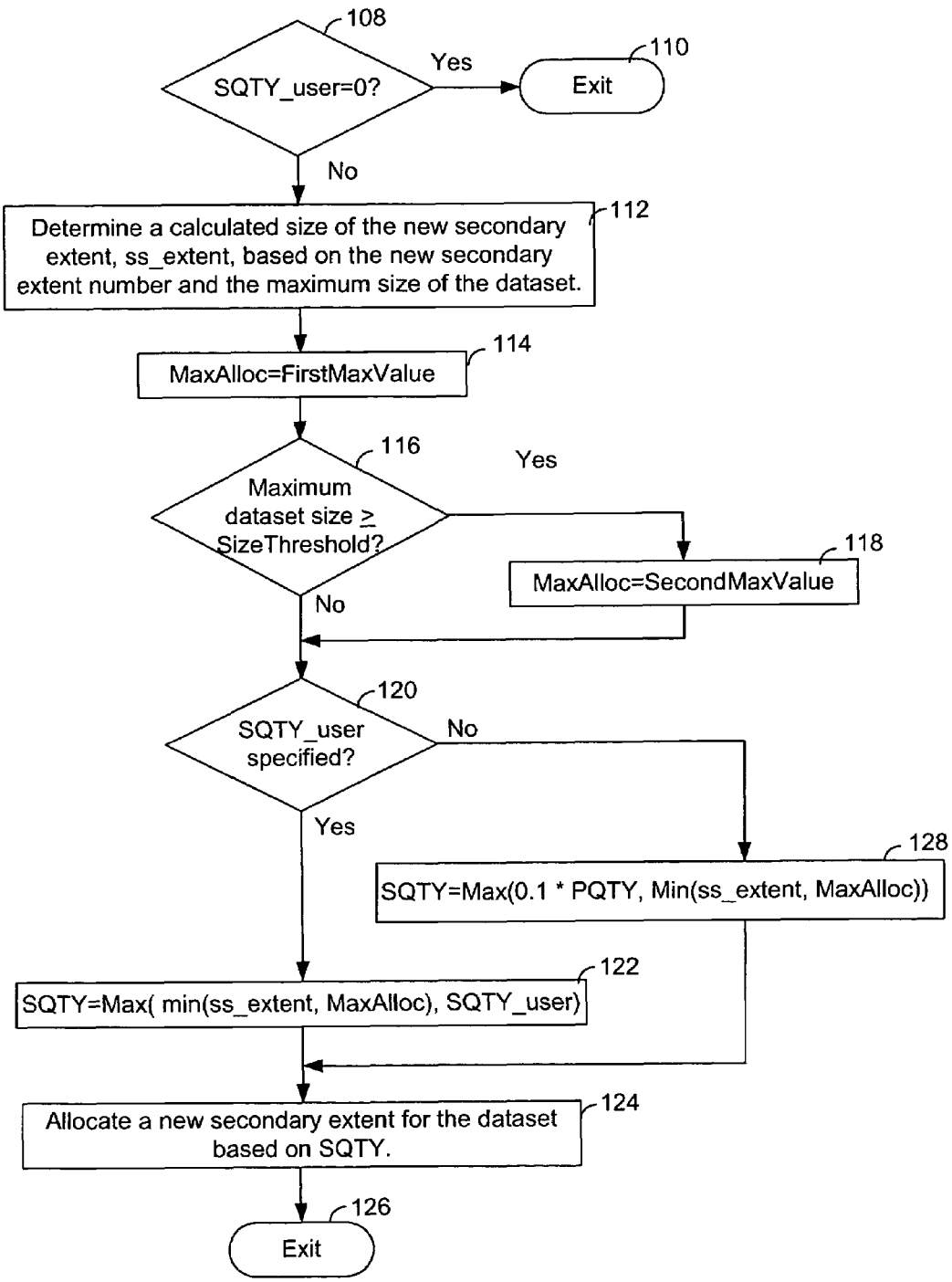
FIG. 5 depicts a flowchart of a more-detailed embodiment of the adaptive allocation module of FIG. 4.

FIG. 5 depicts a flowchart of an embodiment of the adaptive allocation module of FIG. 2 that implements the rules described above. The following variables may be supplied to the adaptive allocation module. The size of the primary extent (PQTY) either specified by a user (PQTY_user) or a default value (PQTY_def) rounded up to the nearest cylinder is provided. The size of a user-specified secondary extent (SQTY_user) may be provided. The maximum size of the dataset is provided. In one embodiment, a dataset may have any of the following maximum dataset sizes: 1, 2, 4, 16, 32 or 64 gigabytes. However, the invention is not meant to be limited to 1, 2, 4, 16, 32 or 64 gigabyte datasets and may be used with other maximum dataset sizes.

In FIG. 5, in step 108, the adaptive allocation module determines whether a user specified that the secondary extent size is equal to zero. In particular, the adaptive allocation module determines whether the user-defined variable, called SQTY_user, is equal to zero. If so, the adaptive allocation module exits (step 110), and a new secondary extent is not allocated.

If, in step 108, the user-specified secondary extent size is not equal to zero, in step 112, the adaptive allocation module determines a calculated size of the new secondary extent, ss_extent, based on the new secondary extent number and the maximum size of the dataset. The value of ss_extent represents a number of cylinders.

In step 114, a variable, called MaxAlloc, stores a maximum size of a secondary extent for a dataset, and is set equal to a first maximum value (FirstMaxValue). In one embodiment, the value of the first maximum value (FirstMaxValue) is equal to 127 (cylinders). Step 116 determines whether the maximum dataset size is greater than or equal to a dataset size threshold (SizeThreshold). If so, in step 118, the maximum size of the secondary extent for the dataset (MaxAlloc) is set equal to a second maximum value (SecondMaxValue). In one embodiment, the value of the second maximum value is equal to 559 (cylinders). Step 118 continues to step 120. If, in step 116, the maximum dataset size is less than the dataset size threshold (SizeThreshold), step 116 proceeds to step 120.

In step 120, the adaptive allocation module determines whether a user specified the size of the secondary extents. In particular, in step 120, the adaptive allocation module determines whether the variable called SQTY_user is specified. In step 122, the adaptive allocation module determines the size of the new secondary extent (SQTY), in cylinders, as follows:

SQTY=Max(min(ss_extent, MaxAlloc), SQTY_user).

In this way, the size of the new secondary extent in SQTY is not less than the value of a user-specified secondary extent size in SQTY_user.

In step 124, the adaptive allocation module allocates a new secondary extent with the number of cylinders specified by SQTY. In step 126, the adaptive allocation module exits.

If step 120 determined that the user did not specify a secondary extent size, in step 128, the adaptive allocation module determines the size of the new secondary extent as follows:

SQTY=Max(0.1*PQTY_cyls, min(ss_extent, MaxAlloc)).

In this way, if a user did not specify the size of a secondary extent, the size of the new secondary extent is equal to at least ten percent of the size of the primary extent. Step 128 then proceeds to step 124 to allocate the new secondary extent based on the value of SQTY.

Figure 6:
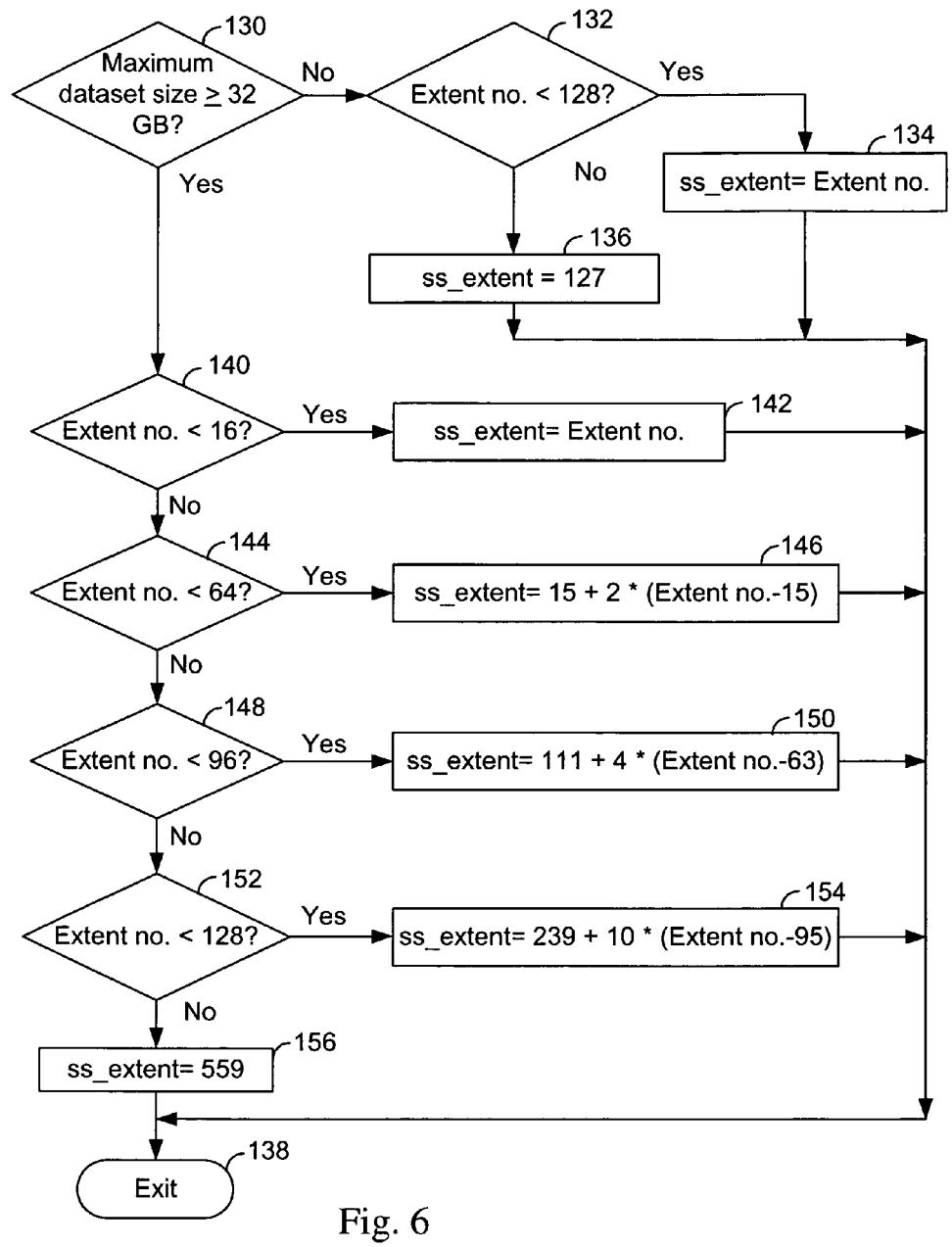
FIG. 6 depicts a more-detailed flowchart of an embodiment of a technique to determine a calculated size of a new secondary extent of FIG. 5.

FIG. 6 depicts a more-detailed flowchart of determining a calculated size of the new secondary extent, ss_extent, based on the new secondary extent number and the maximum size of the dataset of step 112 of FIG. 5. A variable called "Extent no." represents the new secondary extent number about to be allocated. Based on whether the maximum size of the dataset is less than or greater than or equal to thirty-two gigabytes, the adaptive allocation module will use either a first sliding-scale or a second sliding-scale to determine the calculated size of the new secondary extent, ss_extent, for at least a subset of secondary extent numbers.

In step 130, the adaptive allocation module determines whether the maximum size of the dataset is greater than or equal to thirty-two gigabytes. If not, step 132 determines whether the value of the new secondary extent number (extent no.) is less than one hundred twenty-eight, a first secondary extent clipping threshold. If so, in step 134, the calculated size of the new secondary extent, ss_extent is set equal to the extent number. In this way, the intermediate value of the size of the new secondary extent is determined using a first sliding scale. The adaptive allocation module continues to step 138 which proceeds to step 116 of FIG. 5. If step 132 determined that the value of the new secondary extent number is greater than or equal to 128, in step 136, the calculated size of the new secondary extent, ss_extent, is set equal to 127, and step 136 proceeds to step 138.

If, in step 130, the adaptive allocation module determined that the maximum dataset size is greater than or equal to thirty-two gigabytes, a second sliding scale will be used to determine the size of the new secondary extent. In step 140, the adaptive allocation module determines whether the new secondary extent number is less than sixteen. If so, in step 142, the adaptive allocation module sets the value of ss_extent equal to the extent number and proceeds to step 138. If step 140 determined that the new secondary extent number is not less than sixteen, in step 144, the adaptive allocation module determines whether the new secondary extent number is less than sixty-four. If so, in step 146, the value of ss_extent is determined as follows:

$$ss\_extent = 15 + 2*(\text{Extent no.} - 15).$$

The adaptive allocation module proceeds step 138.

If, in step 144, the adaptive allocation module determined that the value of the new secondary extent number is not less than sixty-four, in step 148, the adaptive allocation module determines whether the value of the new secondary extent number is less than ninety-six. If so, in step 150, the value of ss_extent is determined as follows:

$$ss\_extent = 111 + 4*(\text{Extent no.} - 63).$$

The adaptive allocation module proceeds step 138.

If, in step 148, the adaptive allocation module determined that the value of the new secondary extent number is not less than ninety-six, in step 152, the adaptive allocation module determines whether the value of the new secondary extent number is less than one hundred twenty-eight. If so, in step 154, the adaptive allocation module determines the value of ss_extent as follows:

$$ss\_extent = 239 + 10*(\text{Extent no.} - 95).$$

The adaptive allocation module proceeds step 138.

If, in step 152, the adaptive allocation module determined that the value of the new secondary extent number is not less than one hundred twenty-eight, another secondary extent clipping threshold, in step 156, the adaptive allocation module sets the value of ss_extent equal to 559, and the adaptive allocation module proceeds step 138.

In the embodiment described above with respect to FIG. 6, the technique has two sliding scales. A first sliding scale is used for datasets which can grow up to sixteen gigabytes, and a second sliding scale is for datasets that can grow up to thirty-two gigabytes and sixty-four gigabytes. In another embodiment, a single sliding scale is used for all dataset sizes. In yet another alternate embodiment, three or more dataset size thresholds may be provided and three or more respective sliding scales may be used.

In FIG. 6, the second sliding scale applies one or more linear functions of the form y=mx+b to the extent number, where x represents the new secondary extent number, y represents the calculated size of the new secondary extent, where m represents the slope of the function, and b represents the y-intercept, to different ranges of values of secondary extent numbers. The slope of the function m represents the change in the size of the secondary extent divided by the change in the secondary extent number. The slope of the second sliding scale starts at one and increases to two, four and ten as the secondary extent numbers increase.

In yet another embodiment, the following exemplary pseudo-code is used to determine the size of the new secondary extent in cylinders. The variable ss_extent contains a calculated size of the new secondary extent in cylinders.

```
/* Calculate the size of the secondary extent, in cylinders, using a sliding scale */
If maximum_dataset_size >= 32 Gigabytes Then Do
   /* Large dataset sliding scale */
   MaxAlloc=559
   Select
      When extent_no < 16 Then ss_extent = extent_no
      When extent_no < 64 Then ss_extent = 15 + 2 * (extent_no - 15)
      When extent_no < 96 Then ss_extent = 111 +4 * (extent_no - 63)
      When extent_no < 128 Then ss_extent = 239 + 10 * (extent_no - 95)
      Otherwise ss_extent = 559
   End
End
Else Do
   /* Small dataset sliding scale */
   MaxAlloc=127
   If extent_no < 128 Then ss_extent = extent_no
   Else ss_extent = 127
End
/* calculate 10% of the size of the primary extent (PQTY) but limit by the maximum
size of the dataset of the sliding scales */
If no user-specified secondary extent size (SQTY_user), Then
     SQTY = Max(0.1*PQTY, Min(ss_extent, MaxAlloc))
End
If there is a user-specified secondary extent size (SQTY_user) > 0, Then
    /* Use the greater of the sliding scale and the catalog secondary quantity */
    /* allows a user to override with a larger SQTY_user to reach 64GB faster */
    SQTY = Max(Min(ss_extent, MaxAlloc), SQTY_user)
Allocate a new secondary extent having a size of SQTY
```

Figure 7:
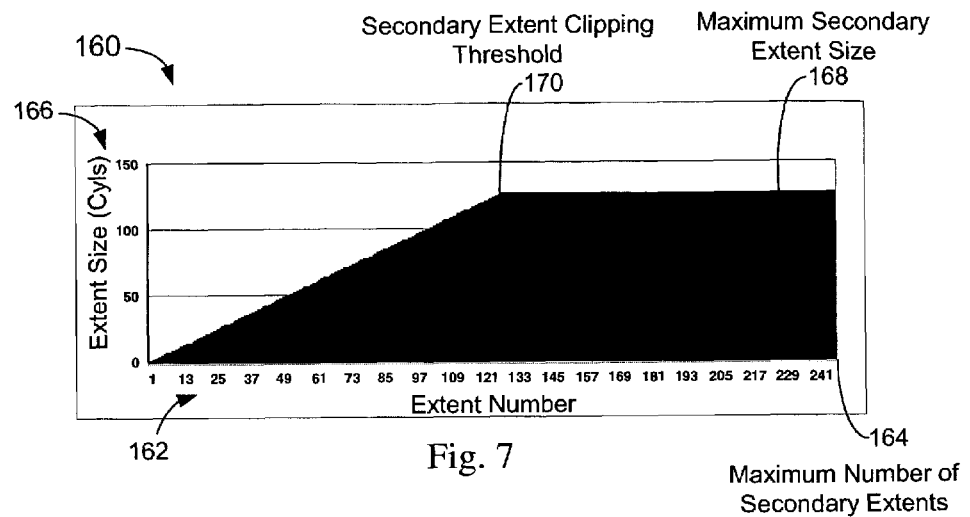
FIG. 7 depicts a graph illustrating the size of secondary extents for datasets having a maximum dataset size of up to thirty-two gigabytes.

FIG. 7 depicts a graph 160 illustrating the size of secondary extents for datasets having a maximum dataset size up to and including sixteen gigabytes that was generated in accordance with the technique of FIG. 6. The x-axis 162 represents the extent number which ranges from one to a maximum number of secondary extents 164 which, in one embodiment is equal to 246. The y-axis 166 represents the size of the secondary extents in cylinders (Cyls). The size of the secondary extents increases linearly until reaching a maximum secondary extent size 168 at a secondary extent clipping threshold 170, which, in this example, is equal to one hundred twenty-eight. For small datasets, for example, one gigabyte datasets, the sizes of the secondary extents increase with respect to the extent number, and the secondary extent clipping threshold is not reached.

Figure 8:
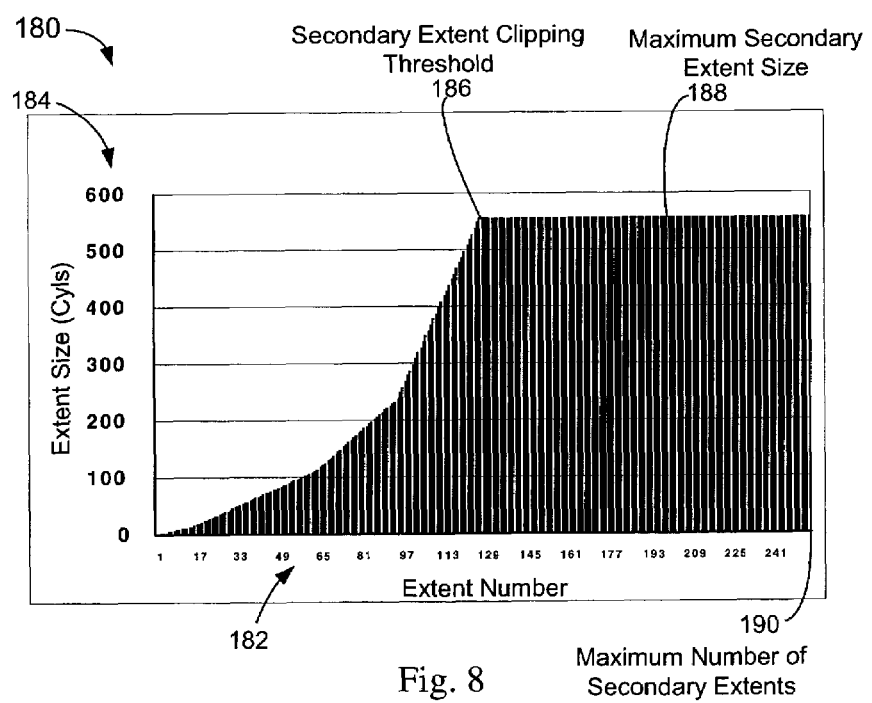
FIG. 8 depicts a graph illustrating the size of secondary extents for datasets having a maximum dataset size of sixty-four gigabytes.

FIG. 8 depicts a graph 180 illustrating the size of secondary extents for datasets having a maximum dataset size of sixty-four gigabytes that was generated in accordance with the technique of FIG. 6. The x-axis 182 represents the extent number. The y-axis 184 represents the size of the secondary extents in cylinders. Initially, the size of the secondary extents increases slowly, and continues to increase more rapidly as the secondary extent numbers increase until a secondary extent clipping threshold 186 is reached, at which point, the size of the secondary extents remains constant at the maximum secondary extent size 188 until the maximum number of secondary extents 190 is reached. In this example, the secondary extent clipping threshold 186 is equal to one hundred twenty-eight. The following relationship describes the relationship of the sum of the secondary extent sizes to the maximum size of the dataset:

$$MaximumSizeOftheDataset \leq SizeOfPrimaryExtent + \sum_{i=1}^{MaximumNumberOfSecondaryExtents} SizeOfSecondaryExtent(i)$$

The secondary extent clipping threshold, the sliding scale, the maximum number of secondary extents and the maximum size of the secondary extents are chosen in accordance with the above relationship. Ideally, in one embodiment, the maximum size of the dataset is equal to the sum of the primary extent size and all secondary extent sizes. Alternately, the maximum size of the dataset is less than, but close to, the sum of the primary and secondary extent sizes. In yet another embodiment, the secondary extent size, ss_extent, monotonically increases.

Figure 9:
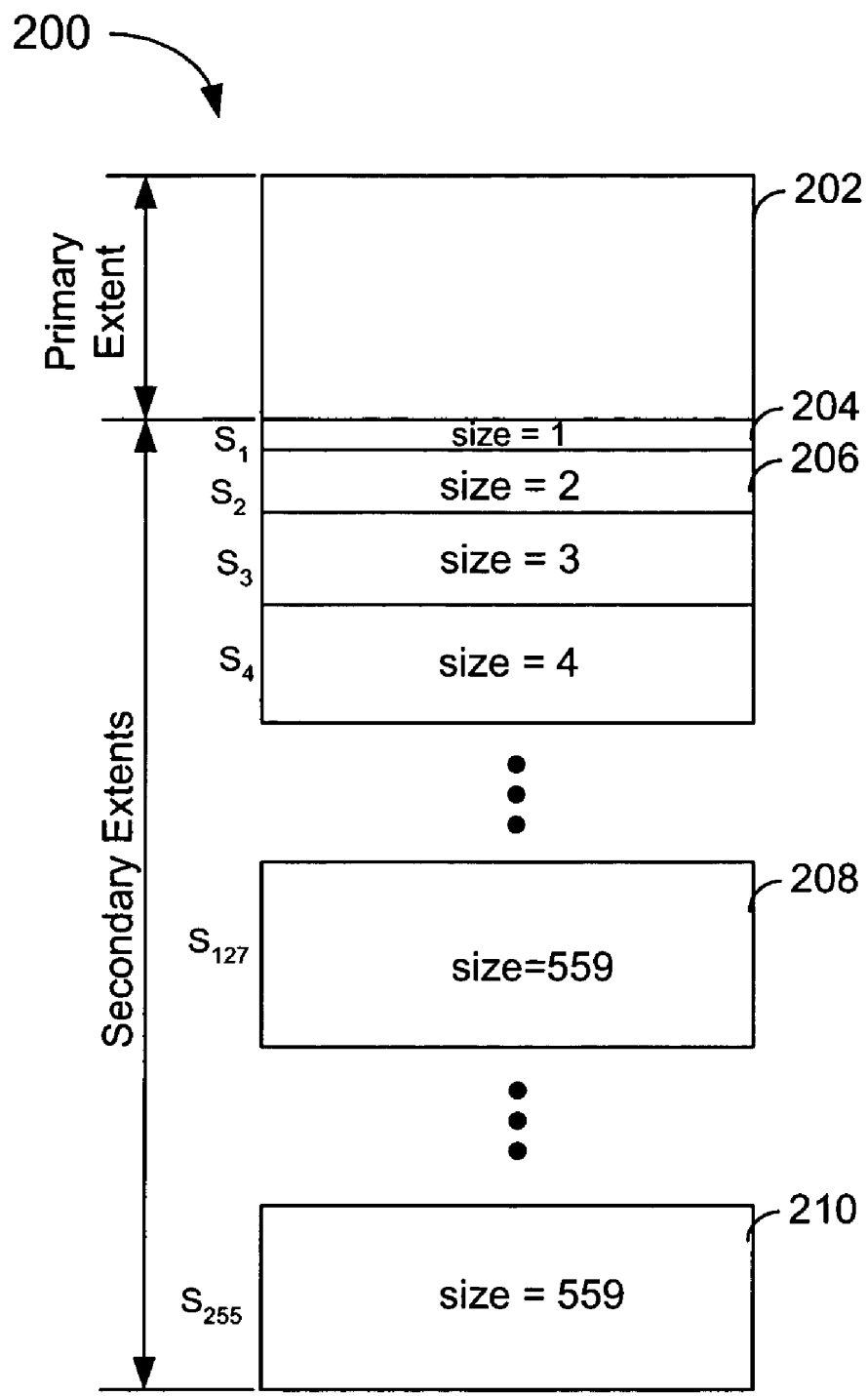
FIG. 9 depicts exemplary primary and secondary extents to store a dataset having a maximum dataset size of sixty-four gigabytes that were allocated with a size that was determined in accordance with the technique of FIGS. 5 and 6.

FIG. 9 depicts an exemplary dataset 200 having a maximum dataset size of sixty-four gigabytes, in which its secondary extents were allocated using the technique of FIG. 6. The dataset 200 has a primary extent 202. The first secondary extent $S_1$ 204 has a size of one cylinder. The second secondary extent $S_2$ 206 has a size of two cylinders. The size of the secondary extents continues to increase up to the $127^{th}$ secondary extent $S_{127}$ 208 which has a size of 559 cylinders. The size of the secondary extents remains at 559 cylinders until the $255^{th}$ secondary extent number $S_{255}$ 210 is reached. FIG. 9 shows the primary and secondary extents as contiguous blocks of memory. In practice, the primary and secondary extents may not be contiguous. In addition, the primary and secondary extents may reside on different volumes, that is, hard disk drives.

Figure 10:
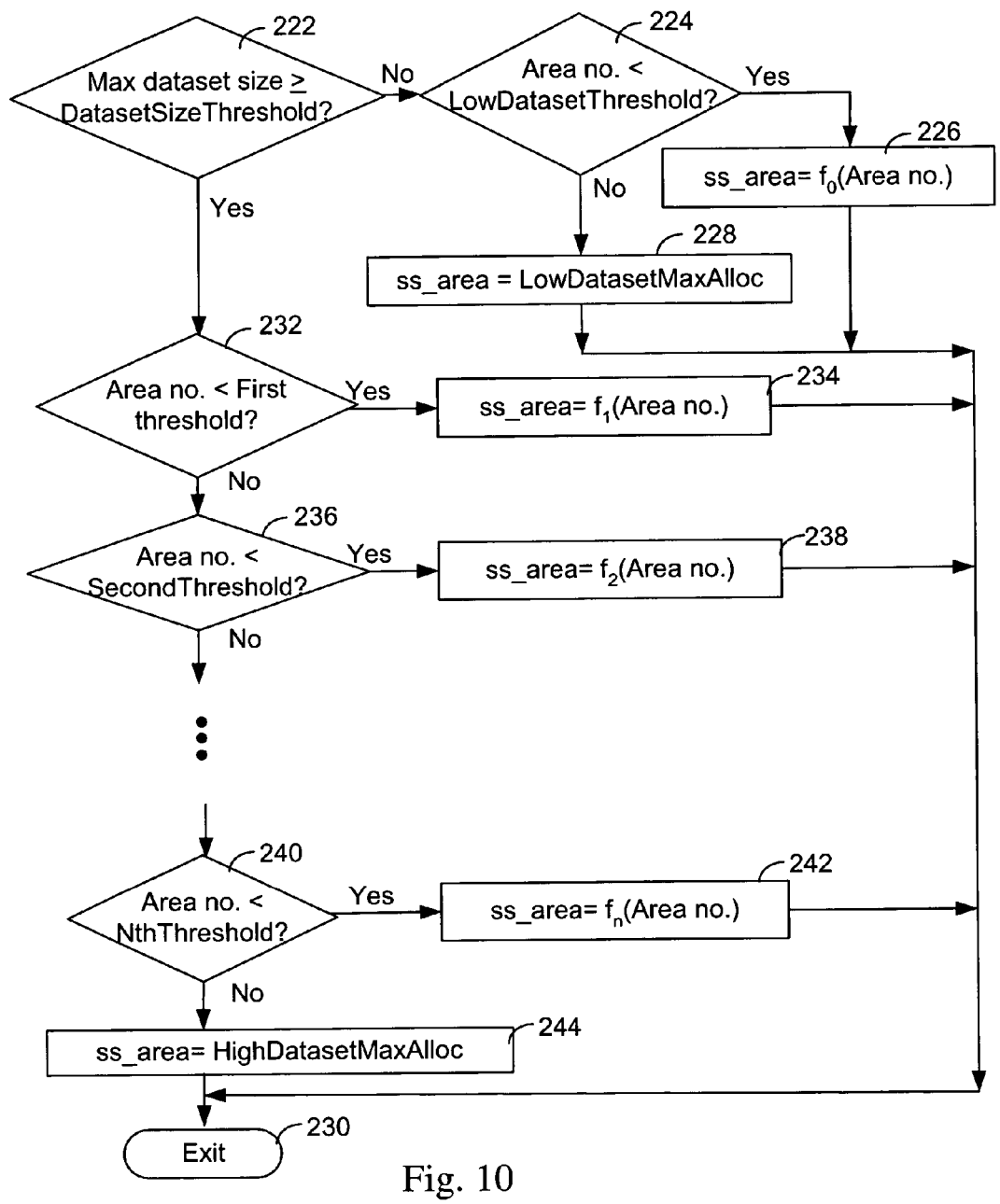
FIG. 10 depicts a flowchart of a more general embodiment of the technique of FIG. 6.

FIG. 10 depicts a flowchart of a more general embodiment of the technique of determining a size of an additional area, for example, a secondary extent, of step 112 FIG. 5. In FIG. 10, the term "Area no." refers to a number of an additional area, such as, for example, a secondary extent number, and the term "ss_area" refers to the calculated size of the additional area, such as, for example, the calculated size of a secondary extent. In step 222, the adaptive allocation module determines whether the maximum (max) dataset size is greater than or equal to a dataset size threshold (DatasetSizeThreshold). If not, in step 224, the adaptive allocation module determines whether the new additional area number is less than a LowDatasetThreshold, that is, a first additional area clipping threshold. If so, in step 226, the value of ss_area is determined as follows:

$$ss\_area = f_0(\text{Area No.}).$$

In one embodiment, the function $f_0$ is linear and is of the form:

$$ss\_area = m * \text{Area No.} + b$$

where m is the slope and b is a real number.

The value of ss_area is rounded to the nearest whole cylinder.

Alternately, the function $f_0$ is linear and is a polynomial of the form:

$$ss\_area = a_n*(\text{Area No.})^n + a_{(n-1)}*(\text{Area No.})^{(n-1)} + \ldots + a_1*(\text{Area No.}) + a_0,$$

where $a_n, a_{(n-1)}, \ldots, a_1$ and $a_0$ are real numbers. The value of ss_area is rounded to the nearest whole cylinder. In another embodiment, the polynomial is monotonically increasing.

Step 226 proceeds to step 230 and exits.

If step 224 determined that the new additional area number is not less than the LowDatasetThreshold, in step 228, the value of ss_area is set equal to a low dataset maximum allocation value (LowDatasetMaxAlloc). Step 228 proceeds to step 230 and exits.

If step 222 determined that the maximum dataset size is greater than or equal to the dataset size threshold, step 232 determines if the new additional area number (Area No.) is less than a first threshold. If so, in step 234 the adaptive allocation module determines a value for the size of the additional area in accordance with a function $f_1$ as follows:

$$ss\_area = f_1(\text{Area no.}).$$

The function $f_1$ can take any of the forms described above for $f_0$. In another embodiment, the first, second, ..., nth thresholds have the following relationship:

First threshold < second threshold < ... < nth threshold

The adaptive allocation module may have any number n thresholds at which the function that is used to determine the size of the additional area changes. Similarly, steps 236 and 238, and 240 and 242, determine the size of the additional area, as in steps 232 and 234, except that the functions $f_2$ and $f_n$, respectively, may differ. In another embodiment the functions $f_1$ to $f_n$ may be linear functions of the form y=mx+b, in which the slope m increases for each function such that the $m_1 < m_2 < \ldots < m_n$.

If step 240 determines that the value of the new additional area number is not less than the Nth threshold, in step 244, the adaptive allocation module is set equal to a high dataset maximum allocation value (HighDatasetMaxAlloc). The Nth threshold is a second additional area clipping threshold. The first and second additional area clipping thresholds may be the same. Alternately, the first and second additional area clipping thresholds may differ. Step 240 proceeds to step 230 and exits.

In yet another embodiment, when the general technique of FIG. 10 is used with FIG. 5, FIG. 5 is modified and the terms of FIG. 5 are used more generally. For example, the term "ss_extent" of FIG. 5 is replaced with the term "ss_area." The term "SQTY_user" refers to a user-specified additional area size, the term "PQTY" refers to an initial area size, and the term "SQTY" refers to the size of the new additional area. Step 112 of FIG. 5 determines a calculated size of a new additional area based on the new additional area number and the maximum size of the dataset. Step 124 of FIG. 5 allocates a new additional area based on SQTY.

Figure 11:
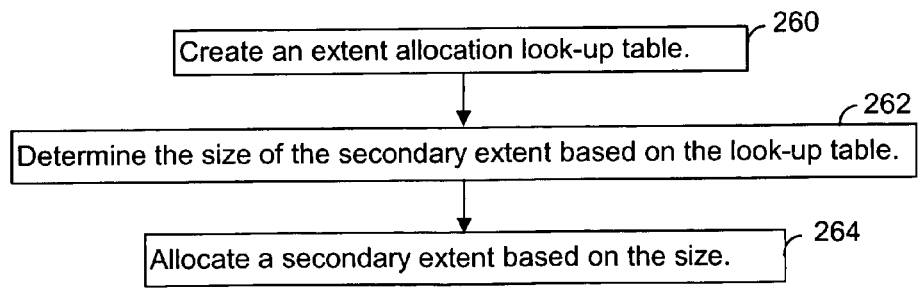
FIG. 11 depicts a high-level flowchart of a process to create and populate an extent allocation look-up table in accordance with the technique of FIG. 6, and using the extent allocation look-up table to determine the size of a new secondary extent.

FIG. 11 depicts a high-level flowchart of a process to allocate a secondary extent using an extent allocation look-up table that was generated in accordance with the technique of FIG. 6. In step 260, an extent allocation look-up table is created with secondary extent sizes that were calculated in accordance with FIG. 6, for predetermined ranges of extent numbers for a set of maximum dataset sizes. In step 262, the size of a new secondary extent is determined based on the look-up table. In step 264, a secondary extent is allocated based on the size of the new secondary extent that was retrieved from the look-up table. Alternately, more generally, the extent allocation look-up table may be applied to areas.

Figures 12, 13:
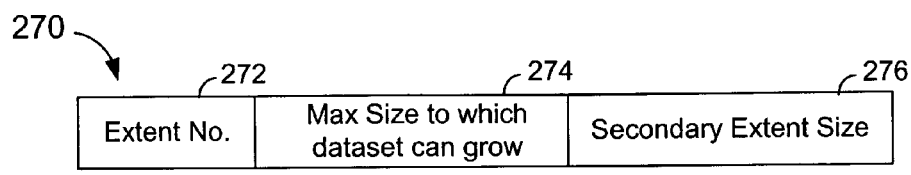
FIG. 12 depicts a diagram of the format of an exemplary extent allocation look-up table of FIG. 11.
FIG. 13 depicts a diagram of an exemplary extent allocation look-up table using the format of FIG. 12 and generated in accordance with the technique of FIG. 6.

FIG. 12 depicts a block diagram of the format 270 of an exemplary extent allocation look-up table entry of FIG. 11. Each record of the lookup table has an extent number 272, a maximum (Max) dataset size to which dataset can grow 274, and a secondary extent size 276.

FIG. 13 depicts a block diagram of portions of an exemplary extent allocation look-up table 280 that is populated with values that were generated in accordance with the technique of FIG. 6. For datasets having a maximum size of one gigabyte, the number of secondary extents ranges from 1 to 54. The value of the secondary extent is equal to the extent number.

Figures 14, 15:
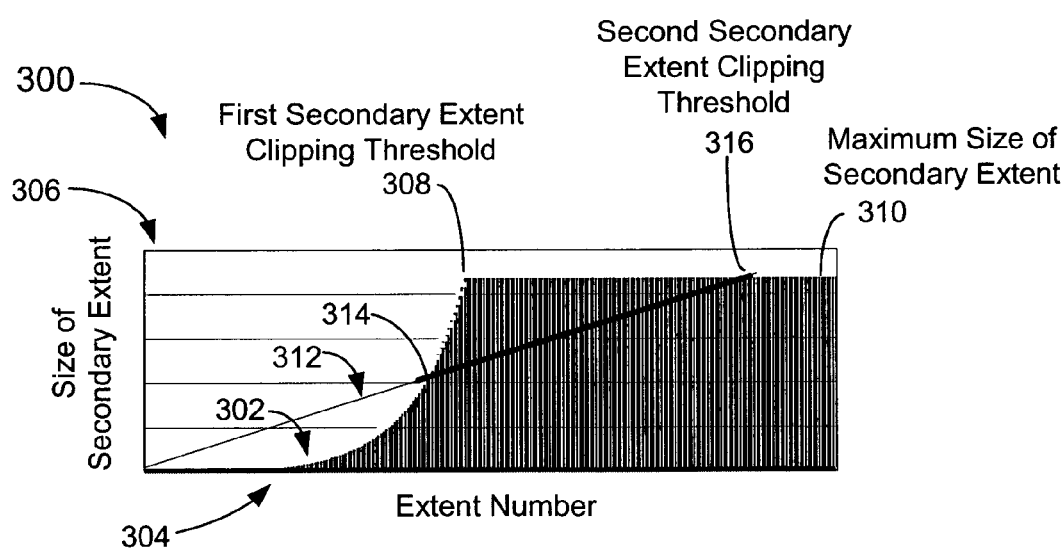
FIG. 14 depicts an embodiment of a technique to determine a size of a secondary extent based on an extent number and a maximum dataset size using the extent allocation look-up table of FIG. 13.
FIG. 15 depicts a graph of an alternate embodiment of the technique to determine the size of a secondary extent using an exponential function, and alternately a combination of a linear function and an exponential function.

FIG. 14 depicts a more-detailed embodiment of a technique to determine a size of a secondary extent based on an extent number and a maximum dataset size using the extent allocation look-up table of step 120 of FIG. 5. In step 290 of FIG. 14, the adaptive allocation module determines a size of the new secondary extent, ss_extent, by looking up the size of the new secondary extent in the look-up table based on the value of the new secondary extent number and the maximum dataset size.

FIG. 15 depicts a graph 300 of an alternate embodiment of the technique to determine the size of a secondary extent using an exponential function 302. The x-axis 304 represents the secondary extent number. The y-axis 306 represents the size of the secondary extent. The exponential function 302 is of the form:

$$ss\_extent = a * b^{(extent\ no.)}.$$

In the exponential function above, a and b are real numbers. The value of ss_extent is then rounded to the nearest whole cylinder value. In one embodiment, the value of b is equal to 1.05. At a first secondary extent clipping threshold 308, the value of ss_extent is set equal to a maximum secondary extent size 310.

In an alternate embodiment, a linear function 312 is used to initially determine the size of the new secondary extent then, at a function change threshold 314, the exponential function 302 is used to determine the size of the new secondary extent before reaching the maximum secondary extent size 310 at the first secondary extent clipping threshold 308. In another alternate embodiment, the exponential function 302 is initially used to determine the size of the new secondary extent. At the function change threshold 314, the linear function (darkened line) 312 is used to determine the size of the secondary extent before reaching the maximum secondary extent size 310 at a second secondary extent clipping threshold 316.

Referring back to FIG. 10, in yet another embodiment, at least one of the functions, $f_0$ to $f_n$, to determine the size of the additional area is of the form:

$$ss\_area = a * b^{(Area\ no.)}.$$

In the function above, a and b are real numbers. The value of ss_area is then rounded to the nearest whole cylinder value.

In yet another embodiment, at least one of the functions, $f_0$ to $f_n$, comprises a trigonometric function, for example, an inverse tangent function, of the form:

$$ss\_area = M(\tan^{-1}(a(\text{Area no.})-x\_offset)+y\_offset).$$

The variable "M" is a scaling factor to scale the function to the maximum additional area size. The variable "a" is a factor to expand or contract the inverse tangent function along the x-axis. The value of x_offset is used to place the inverse tangent function at a desired point on the x-axis when the value of the extent number is equal to one. The value of y_offset is used to raise the inverse tangent function so that, at its limit, the value of the inverse tangent function approaches three. The value of M is chosen such that the maximum secondary area size is reached as the additional area number becomes very large.

In yet another alternate embodiment, at least one or any combination of the linear, polynomial, exponential or trigonometric functions described above are used, at least in part, to determine the size of a new additional area. In another alternate embodiment, the additional area sizes increase in steps for groups of additional areas. For example, the first five additional areas may have a size of one, and the next seven additional areas may have a size of three.

The look-up table may be used to implement any of the above-described functions, and embodiments for determining the size of the additional area.

The invention has been described by way of specific embodiments, but those skilled in the art will understand that various changes in form and detail may be made without deviating from the spirit or scope of the invention.

What is claimed is:

1. A computer-implemented method, comprising:
   storing data of a dataset in an initial area;
   in response to a determination that the dataset does not have sufficient allocated space to store an additional data, identifying a new area number based on a previous area number;
   determining a size of a new additional area, the new additional area being associated with the new area number, wherein the size of the new additional area is based on the new area number, wherein if the new area number does not exceed a clipping threshold, the size of the new additional area being greater than the size of each previously allocated additional area of the dataset, wherein if the new area number exceeds the clipping threshold, the size of the new additional area being a predetermined maximum additional area size not less than the size of each previously allocated additional area;
   allocating the new additional area for the dataset in storage based on the size of the new additional area; and
   storing the additional data of the dataset in the new additional area.

2. The method of claim 1 wherein the said determining accesses a lookup table based on the new area number and a maximum size of the dataset to determine the size of the new additional area.

3. The method of claim 1 further comprising:
   setting the predetermined maximum additional area size based on a specified maximum size of the dataset.

4. The method of claim 1 further comprising:
   setting the clipping threshold to a midpoint of a predetermined maximum number of additional areas.

5. The method of claim 1 wherein the initial area is associated with an initial area size, further comprising:
   setting the size of the new additional area to equal a fraction of the value of the initial area size, in response to the fraction of the value of the initial area size exceeding the determined size of the new additional area.

6. The method of claim 1 further comprising:
   setting the size of the new additional area to equal a predefined user-specified additional area size, in response to the predefined user-specified additional area size exceeding the determined size of the new additional area.

7. The method of claim 1 wherein said determining comprises calculating the new additional area size, at least in part, by applying the new area number to a linear function.

8. The method of claim 1 wherein the new additional area size is determined, at least in part, in accordance with an exponential function.

9. The method of claim 1 wherein the new additional area size is determined, at least in part, in accordance with an inverse tangent function.

10. The method of claim 1 wherein said determining the new additional area size comprises:
    in response to the value of the new area number being less than a first predetermined threshold value, calculating the size of the new additional area, at least in part, by applying the new area number to a first function, and
    in response to the value of the new area number being greater than or equal to the first predetermined threshold value, calculating the size of the new additional area, at least in part, by applying the new area number to a second function, the second function being different from the first function.

11. A computer system, comprising:
    a processor;
    a data storage device storing data of a dataset in an initial area and at least one additional area; and
    a memory comprising instructions that cause the processor to:
       in response to a determination that the at least one additional area does not have sufficient space to store an additional data, identify a new area number based on a previous area number;
       determine a size of a new additional area, the new additional area being associated with the new area number, wherein the size of the new additional area is based on the new area number, wherein if the new area number does not exceed a clipping threshold, the size of the new additional area being greater than the size of each previously allocated additional area of the dataset, wherein if the new area number exceeds the clipping threshold, the size of the new additional area being a predetermined maximum additional area size not less than the size of each previously allocated additional area;
       allocate the new additional area for the dataset in the data storage device based on the size of the new additional area; and
       store the additional data of the dataset in the new additional area.

12. The computer system of claim 11 wherein the additional area size varies at least between groups of additional areas.

13. The computer system of claim 11 wherein the additional area size increases as the number of additional areas increases for at least a subset of the additional areas.

14. The computer system of claim 11 wherein each additional area associated with an area number, and the additional area size increases linearly with respect to the area number, until the area number reaches a predetermined clipping threshold.

15. The computer system of claim 11 said memory further comprising instructions that cause the processor to:
    set the clipping threshold to a midpoint of a predetermined maximum number of additional areas for the dataset, wherein the additional area size monotonically increases up to the clipping threshold.

16. The computer system of claim 11 said instructions for determining calculate the new additional area size, at least in part, by applying the new area number to a linear function.

17. An article of manufacture comprising a computer readable storage medium embodying instructions executable by a computer, said instructions for:
    storing data of a dataset in an initial area;
    in response to a determination that the dataset does not have sufficient allocated space to store an additional data, identifying a new area number based on a previous area number;
    determining a size of a new additional area, the new additional area being associated with the new area number, wherein the size of the new additional area is based on the new area number, wherein if the new area number does not exceed a clipping threshold, the size of the new additional area being greater than the size of each previously allocated additional area of the dataset, wherein if the new area number exceeds the clipping threshold, the size of the new additional area being a predetermined maximum additional area size not less than the size of each previously allocated additional area;
    allocating the new additional area for the dataset in storage based on the size of the new additional area; and
    storing the additional data of the dataset in the new additional area.

18. The article of manufacture of claim 17 wherein said instructions for determining access a lookup table based on the new area number and a maximum size of the dataset to determine the size of the new additional area.

19. The article of manufacture of claim 18 further comprising instructions for setting the predetermined maximum additional area size based on a specified maximum size of the dataset.

20. The article of manufacture of claim 17 wherein the initial area is associated with an initial area size, further comprising instructions for:
    setting the size of the new additional area equal to a fraction of the value of the initial area size, in response to the fraction of the value of the initial area size exceeding the determined size of the new additional area.

21. The article of manufacture of claim 17 further comprising instructions for:
    setting the size of the new additional area equal to a predefined user-specified additional area size, in response to the predefined user-specified additional area size exceeding the determined size of the new additional area.

22. The article of manufacture of claim 17 wherein said instructions for determining calculate the size of the new additional area, at least in part, by applying the new area number to a linear function.

23. The article of manufacture of claim 17 wherein the size of the new additional area is determined, at least in part, in accordance with an exponential function.

24. The article of manufacture of claim 17 wherein the size of the new additional area is determined, at least in part, in accordance with an inverse tangent function.

25. The article of manufacture of claim 17 wherein said instructions for determining the size of the new additional area also:
    in response to the value of the new additional area number being less than a first predetermined threshold value, calculate the size of the new additional area, at least in part, by applying the new area number to a first function, and
    in response to the value of the new additional area number being greater than or equal to the first predetermined threshold value, calculate the size of the new additional area, at least in part, by applying the new area number to a second function, the second function being different from the first function.

26. The article of manufacture of claim 17 wherein said instructions for determining set the clipping threshold to a midpoint of a predetermined maximum number of additional areas.

* * * * *